March 7, 1950 W. A. TRATSCH 2,500,102
COIN-OPERATED WEIGHING MACHINE
Filed July 3, 1946 6 Sheets-Sheet 1

INVENTOR.
Walter A. Tratsch
BY
His Attorney.

March 7, 1950 W. A. TRATSCH 2,500,102
COIN-OPERATED WEIGHING MACHINE
Filed July 3, 1946 6 Sheets-Sheet 2

INVENTOR.
Walter A. Tratsch
BY
His Attorney.

March 7, 1950

W. A. TRATSCH 2,500,102

COIN-OPERATED WEIGHING MACHINE

Filed July 3, 1946

INVENTOR.
Walter A. Tratsch
BY Clarence L. Kneedy
His Attorney.

March 7, 1950   W. A. TRATSCH   2,500,102
COIN-OPERATED WEIGHING MACHINE
Filed July 3, 1946   6 Sheets-Sheet 6
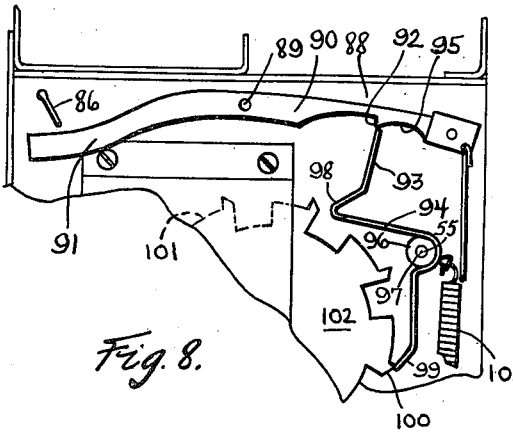
Fig. 8.
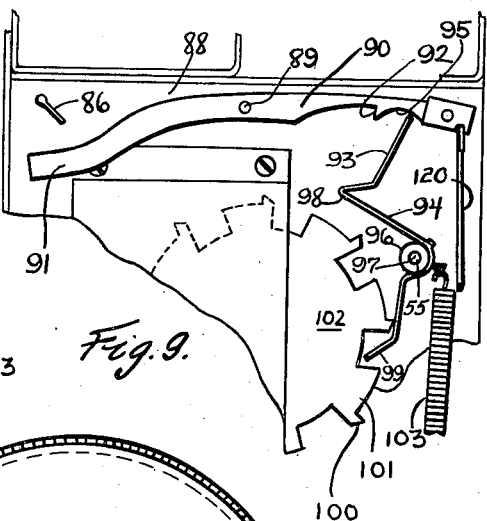
Fig. 9.
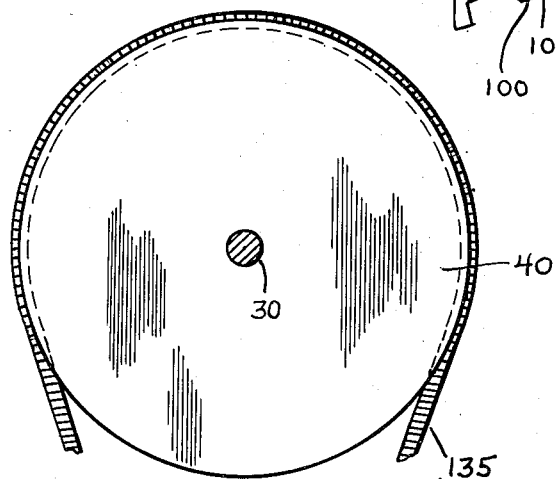
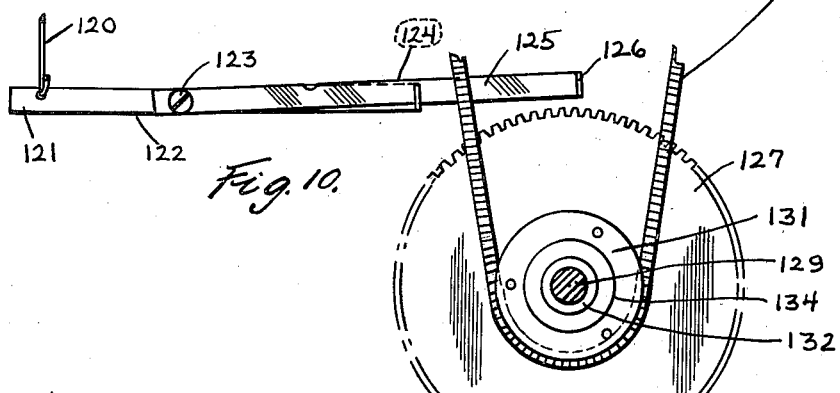
Fig. 10.
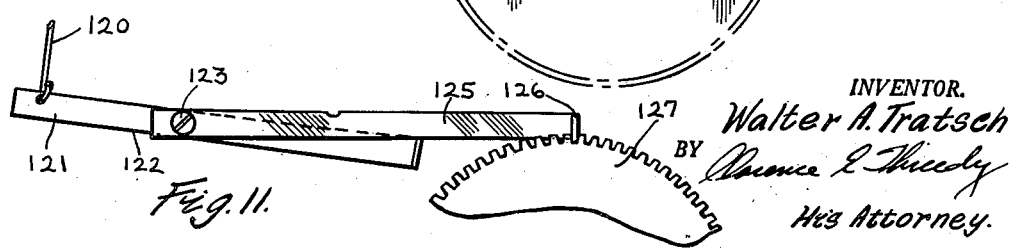
Fig. 11.
INVENTOR.
Walter A. Tratsch
BY
His Attorney.

Patented Mar. 7, 1950

2,500,102

UNITED STATES PATENT OFFICE 2,500,102

COIN-OPERATED WEIGHING MACHINE

Walter A. Tratsch, Chicago, Ill.

Application July 3, 1946, Serial No. 681,219

3 Claims. (Cl. 194—47)

My invention relates to coin-operated weighing machines. More particularly the invention relates to a mechanism placed under power by the patron operating the machine, for timing the operation of a preselected mechanism in a coin-operated weighing machine whereby the patron's coin will within the period of operation be returned to the patron if the weight as actually indicated by the weighing mechanism coincides with that of the preselecting indicator.

In machines with which this invention is related there is provided a preselecting finger operated by the patron prior to the deposit of the coin in the machine, for the purpose of selecting what the patron believes to be his correct weight. In machines of this character there is provided a member rotatable with the weighing mechanism and which, if the patron has correctly determined his weight, will stop in a blocking position with respect to the preselecting mechanism, whereupon, upon blocking of the preselecting mechanism, a butterfly of a coin discharging mechanism is operated to effect return of the coin to the patron. With such a machine, it is an object of this invention to provide a timing mechanism for this operation, in which power is stored up by the timing mechanism each time the patron disposes his entire weight upon the weighing platform. The arrangement is such that the timing mechanism will be effective in operation through a predetermined or fixed period of time, to permit the blocking member and the preselecting mechanism to adjust themselves relative to each other within that fixed period before operating the coin discharge mechanism.

The arrangement further provides a source of power at all times for the operation of the timing mechanism.

Another object of the invention is the provision of releasably latching the selecting mechanism against rotating once the weighing mechanism is placed into operation by the deposit of a coin.

The present invention constitutes an improvement over that shown in United States Patent No. 2,189,866, granted February 13, 1944, to William G. Simmons on a Scale.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 8 is a fragmentary detail view of the timing control mechanism shown in Fig. 4, but showing the parts thereof in different position;

Fig. 9 is a fragmentary detail view similar to that shown in Fig. 8, but showing the parts thereof in different position;

Fig. 10 is a detail view of the preselecting latch mechanism;

Fig. 11 is a view similar to Fig. 10 showing the parts in latched position;

The drawings illustrate the preferred form of construction by which the several objects of this invention are accomplished.

Figures 1, 12, 13:
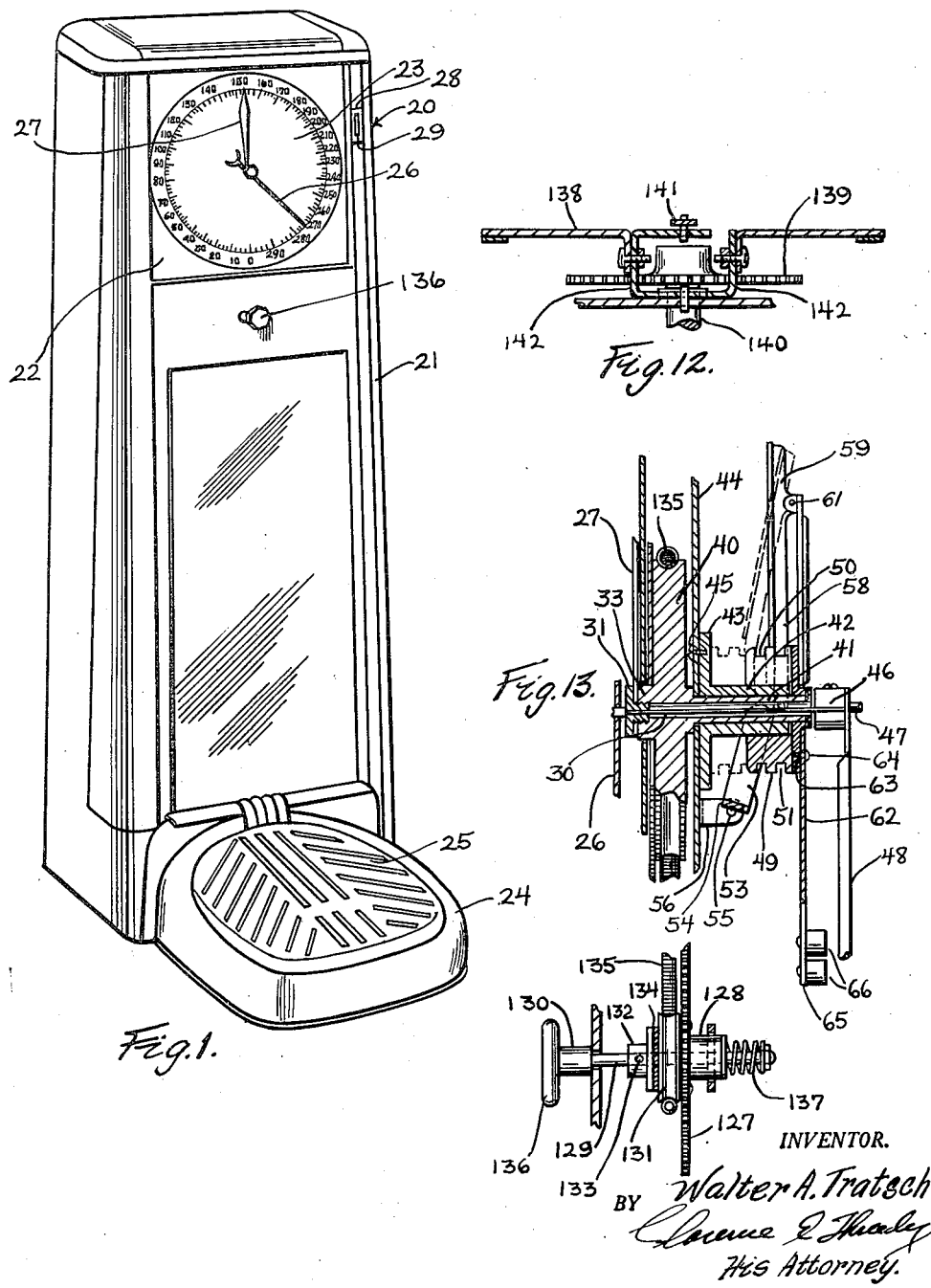
Fig. 1 is a perspective view of a scale with which my invention is associated.
Fig. 12 is a fragmentary detail view taken substantially on line 12—12 of Fig. 4.
Fig. 13 is a vertical sectional detail view of the preselecting and weighing scale pointer assembly.

Referring particularly to Fig. 1, a conventional weighing machine is indicated at 20. This machine includes an upright cabinet 21 having a viewing panel 22 through which the scale bearing dial 23 is radially viewed. At the base of the cabinet 21 is a base member 24 having the usual weighing platform 25.

In Fig. 1, the weighing pointer is indicated at 26 and the preselecting pointer at 27. To operate the mechanism to be hereinafter described, an escutcheon plate 28 is provided on the front wall of the cabinet 21, and this escutcheon plate has a coin slot 29 formed therein for the deposit of coins.

In Fig. 13, I have illustrated in sectional detail the assembly of the weighing pointer and the preselecting pointer. In this connection, the weighing pointer 26 is mounted upon a shaft 30 projecting through a nipple 31 threaded into the hub 33 of a pulley 40. This nipple 31 secures the preselecting pointer 27 to the pulley 40 for rotation therewith in a manner hereinafter to be described.

The pulley 40 on its inner side provides a sleeve 41 fitting into the hub 42 of a plate 43 secured to a wall 44 of the scale mounting structure as at 45. The inner end portion of the shaft 30 terminates into a coupling 46 and is joined by this coupling 46 to the weighing shaft 47. On this weighing shaft 47 there is carried a blocking finger 48.

Movably longitudinally of the hub 42 is a collar 49 having spaced annular grooves 50 and 51 formed therein.

In the groove 50 there are projected pins 52 carried by the parallel arms 53 of a U-shaped bracket 54 fixed to a rocker shaft 55 carried by brackets 56 in turn carried by the wall 44. Projecting into the grooves 51 are pins 57 carried by opposite arms 58 of a preselector bar 59 having at its upper end portion (Fig. 2) a selector pin 60. This preselector bar 59 is pivotally supported as at 61 to a plate 62 having a hub plate 63 secured thereto as at 64 and fixed to the sleeve 41 of the pulley 40 for rotation therewith. This plate 62 has an extended portion 65 upon which suitable counterweights 66 are secured to nicely balance the preselector bar 59 about the shaft 47.

The shaft 47 has its inner end portion journalled in a suitable bearing 67, and on this shaft 47 is a pinion 68 operatively meshing with a segmental gear 69 pivotally secured to a shaft 70 in turn supported by suitable brackets 71. On this gear 69 is a roller 72 adapted to engage a cam plate 73 adjustably carried as at 74 by a beam 75 fulcrumed as at 76. This beam 75 is operatively connected with the weighing platform by a depending rod 77 so that when a patron steps on the platform 25, the beam 75, which is under the control of a spring 78, will be caused to move downwardly against the tension of the spring 78, this downward movement of the beam lowering the cam 73 thereto, to permit rotation by gravity of the segmental gear 69 whereby to position the weighing pointer 26 upon the face of the scale 23, at a point indicative of the weight of the patron standing on the platform 25. This arrangement of the scale mechanism for moving the weighing pointer 26, is well-known in the art and in itself constitutes no part of the present invention.

Figure 3:
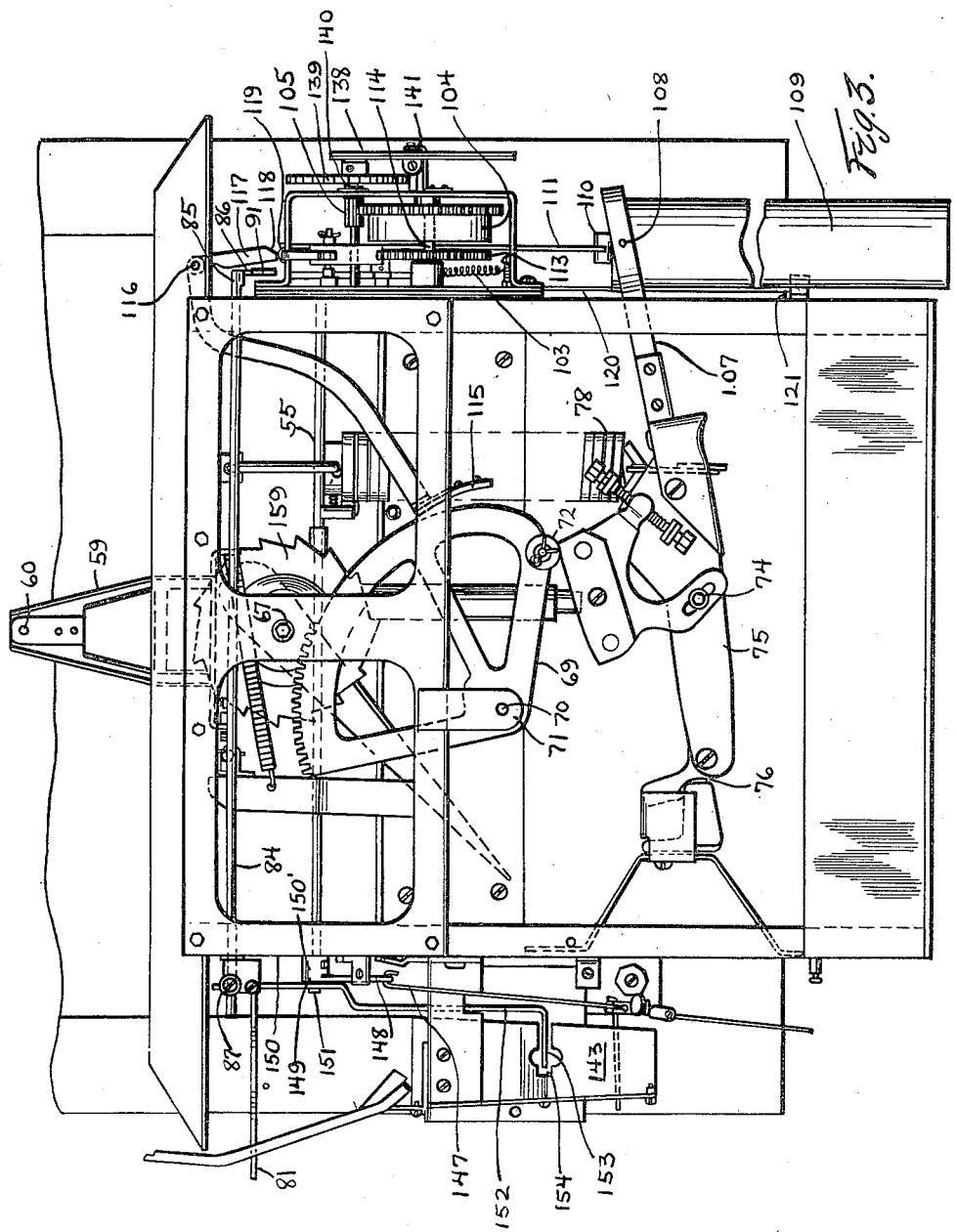
Fig. 3 is a rear elevational view of the weighing mechanism and control means therefor.
Figures 5, 6, 7:
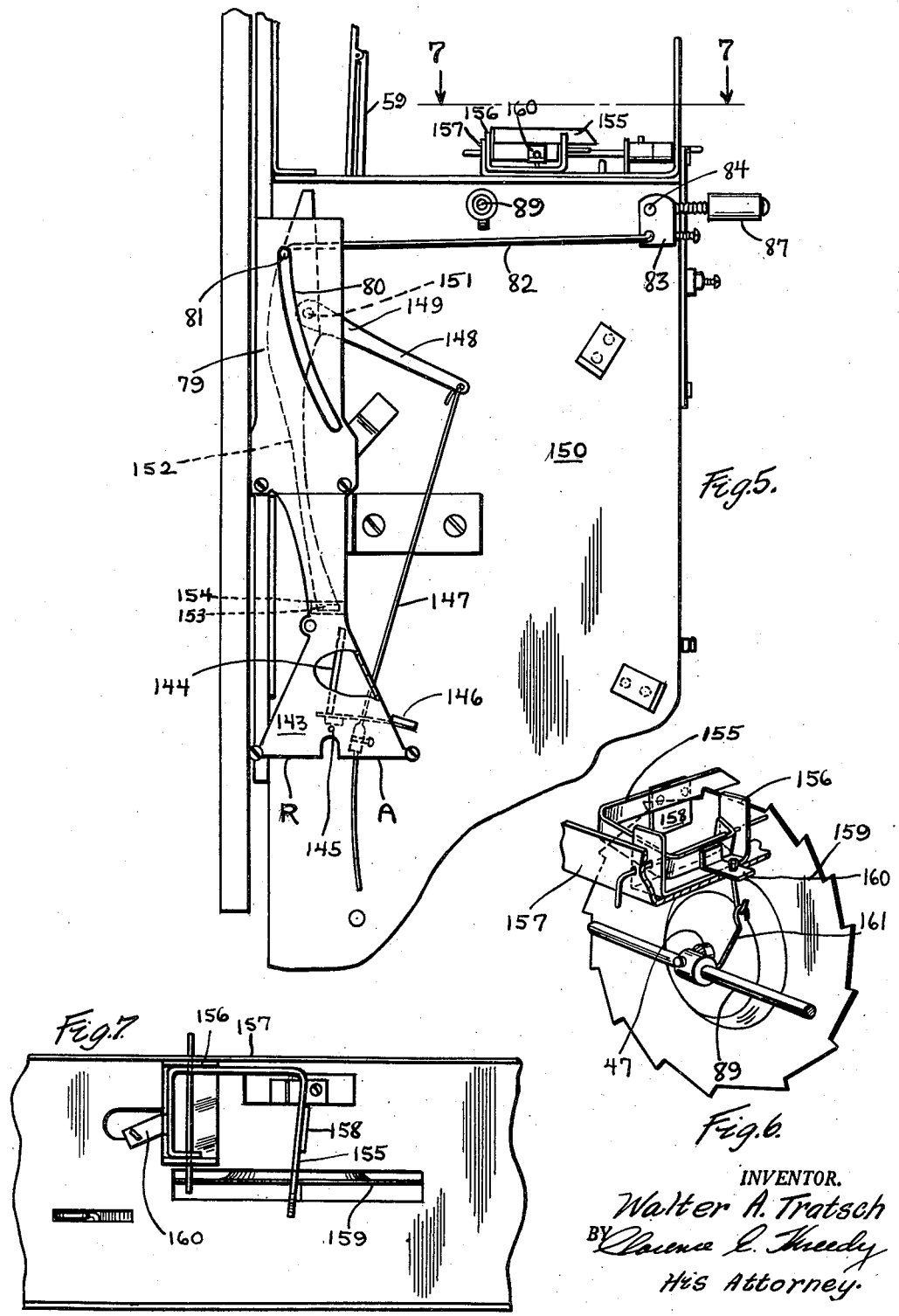
Fig. 5 is a fragmentary left side elevational view of the invention as viewed in Fig. 3.
Fig. 6 is a perspective view of the latch mechanism for the weighing mechanism.
Fig. 7 is a top plan view of the same as taken on line 7—7 of Fig. 5.

Until a coin of proper denomination is deposited through the coin slot 29, the weighing mechanism will not be released for operation. The release of this weighing mechanism for weighing purposes is accomplished in the following manner:

To the rear of the escutcheon plate there is mounted a coin chute 79 (Fig. 5). The opposite side walls of this chute 79 are provided with registering arcuated slots 80, and projecting through these slots 80 in the path of the coin deposited in the coin chute, is the angled end portion 81 of a rocker arm 82, the inner end of which is secured to a coupling 83. This coupling 83 connects the arm 82 with a rocker shaft 84 (Fig. 3).

Figure 4:
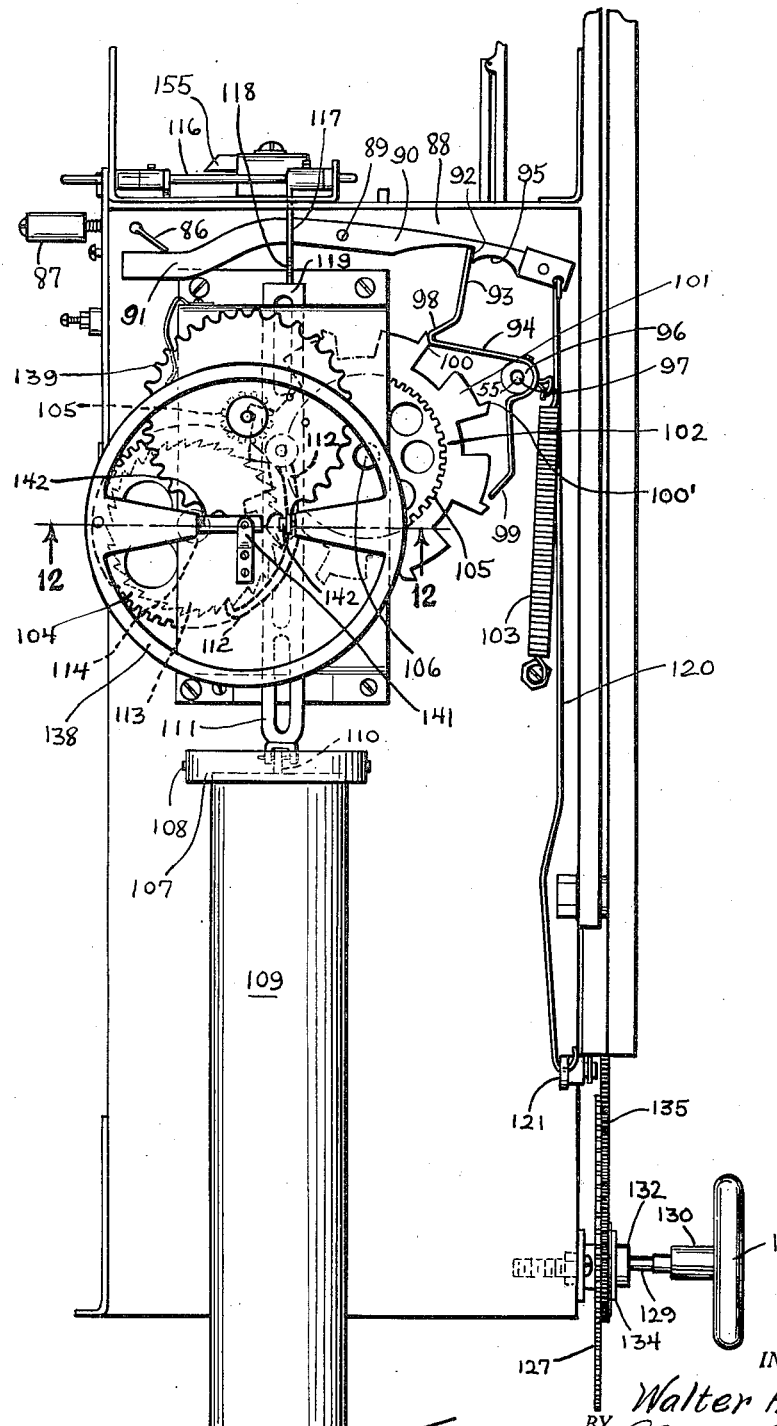
Fig. 4 is a right side elevational view of the invention as viewed in Fig. 3.

The end 85 of this rocker shaft carries a trip finger 86 (Figs. 4, 8, 9). The trip finger 86 is normally retained in the position shown in Fig. 4, by a counterweight 87 (Fig. 5) secured to the coupling 83.

Rotatably carried by the end walls 88 (Figs. 4, 8, 9) of the weighing housing is a rocker shaft 89. This rocker shaft has fixed thereto a latch finger 90. One end portion of this latch finger 90 is curved as at 91 and is adapted to be engaged by the trip finger 86 in a manner hereinafter set forth. Formed in the opposite end portion of the latch finger 90 is a notch 92 into which is adapted to engage the end portion 93 of an arm 94. Adjacent this notch 92 is a curved cut-out portion 95 to provide a clearance for the end portion 93 of the arm 94 when moved into the position shown in Fig. 9.

This arm 94 is connected as at 96 to an end portion 97 of the rocker shaft 55. This arm 94 provides a stop finger 98 and a trip finger 99, the trip finger 99 being adapted to successively engage cam lugs 100 provided by spaced teeth 101 of a wheel 102. This finger 94 and the shaft 55 are rotated in a clockwise direction, as viewed in Fig. 4, by the action of a spring 103.

The wheel 102 is a part of a power mechanism for effectuating timing of the operation of the preselector bar 59. This power mechanism may be of any approved construction including a power spring 104 geared by a train of gears 105 to a shaft 106 rotatably carrying the wheel 102.

The winding of this power spring 104 is effectuated each time the patron stands upon the platform 25, and this is accomplished as follows:

The beam 75 has an arm 107 pivotally connected as at 108 to a pump housing 109 including a piston 110. This piston 110 is connected to a bar 111. This bar 111 carries a pawl 112, which pawl 112 is adapted to engage a gear 113, the gear 113 being fixed to the shaft 114, to one end of which the power spring 104 is attached, whereby upon rotation of the gear 113 by reciprocal movement of the bar 111, the spring, in a manner well-known in the clock art, will be placed under tension.

The piston 110 is so related with respect to the pump housing 109 that when the power spring 104 is placed under its full tension strength, the pump housing 109 will reciprocate relative to the piston 110 without moving the bar 111 upwardly for spring winding purposes, thus preventing overwinding of the power spring 104.

During this operation of the beam 75 and the piston 110 of winding the power spring 104, the gear 69 is held against rotation by a brake 115 pivoted (Fig. 3) to a shaft 116. This shaft carries a depending finger 117 having a cam surface 118 adapted to be engaged by the upper end portion 119 of the bar 111 when this bar 111 is raised upwardly by action of the pump 109. Each time the bar 111 moves upwardly, it will engage the cam surface 118, pivot the shaft 116 in a clockwise direction, thereby bearing the brake 115 against the edge of the gear 69 to hold this gear 69 against rotation, and consequently holding the weighing finger 26 against rotation.

The latch finger 90 has connected thereto one end portion of a rod 120. The lower end portion of this rod 120 is connected to an end portion 121 (Figs. 4, 10, 11) of a lever 122 pivoted as at 123 to an adjacent wall of the weighing structure. The end portion of this lever 122 is bifurcated as at 124, and in this bifurcated portion is adapted to move a latch finger 125 pivoted to the point 123, which in turn pivots the lever 122 to the adjacent wall of the weighing structure. The angled end portion 126 of this latch finger 125 is adapted to engage the teeth of a gear 127. This gear 127 (Fig. 13) has a hub 128 through which projects a shaft 129. The shaft 129 is journalled in a suitable bearing 130 carried by the adjacent wall of the scale housing. The gear 127 has fixed thereto a pulley 131. On this shaft 129 is arranged a disc 132 secured to the shaft by a suitable set screw 133, and this disc 132 carries a friction disc 134 which is adapted to have driving frictional engagement with the pulley 131. The pulley 131 is connected to the pulley 40 by means of a spring belt 135. The arrangement is such that when the latch end 126 of the latch finger is in the position shown in Fig. 10, upon rotation of the shaft 129 through the medium of the handle 136, rotation will be imparted to the pulley 131 by reason of the frictional engagement between this pulley and the friction disc 134. However, should the latch end 126 be in engagement with the gear 127 as shown in Fig. 11, no rotation will be imparted to the pulley 131 upon rotation of the shaft 129. Thus, by this arrangement, once the penny is deposited in the coin slot, the shaft 129 cannot be rotated to impart rotation to the pulley 40 for resetting the preselecting pointer 27. The tension of the friction disc 134 against the pulley 131 is adjusted by means of a spring 137 (Fig. 13).

The power structure hereinbefore referred to includes an escapement wheel 138, the details of which are shown in Fig. 12. In this connection a gear 139 is mounted upon a shaft 140, and this shaft, by means of the train of gears 105, is connected to the power spring 104. The escapement wheel 138 is pivotally carried by a bracket 141 and includes opposite arms 142 which are adapted to alternately engage and disengage the teeth of the escapement gear 139 so that the unwinding of the power spring 104 will be even and positively controlled.

The coin from the chute 79 falls into a distributing housing 143 comprising an acceptance outlet A and a rejection outlet R. Whether the coin passes through the acceptance outlet or the rejection outlet, A and R, respectively, is controlled by a valve plate 144 normally disposed within the distributing housing so as to accept coins or direct coins through the acceptance outlet A. This valve plate 144 is mounted on a shaft 145 and is similar in construction and operation to that shown in the Simmons Patent, No. 2,189,866, hereinbefore referred to. This shaft 145 has a weight-supporting arm 146 secured thereto, and this arm is connected by means of a wire length 147 to an arm 148 of a bell crank 149 fixed to the end of the shaft 55 as at 151, journalled in a hub 150' carried by side wall 150 (Figs. 5 and 13).

This bell crank 149 has an extended portion 152, the lower end of which is angled as at 153, and this angled end portion 153 normally is positioned in a slot 154 formed in the coin distributor 143, whereby to block the dropping of coins therethrough until the valve plate 144 is moved to a position to reject a coin.

Means for latching the weighing mechanism against operation when no proper coin has been inserted, comprises a latch arm 155 pivotally carried by a mounting bracket 156 secured to the top wall 157 of the weighing housing. This latch arm 155 has a counterweight 158 secured thereto so that the latch arm 155 by gravity will move into latched engagement with the latch wheel 159 secured to the shaft 47.

The latch arm 155 has a projection 160, and this projection 160 is connected as at 161 to the shaft 89 (Fig. 6) whereby, upon rocking of the shaft 89 in a clockwise direction as viewed in Fig. 6, the latch arm 155 will be pivoted against action of its counterweight, from engagement with the adjacent teeth of the latch wheel 159, thereby permitting the shaft 47 to be rotated by action of the segmental gear 69. In this manner, while the platform 25 will move down when the weight of a person is disposed thereon, no movement will be imparted to the weighing finger 26 until a coin of proper denomination has been deposited.

The operation of the foregoing construction is as follows:

The patron stands upon the platform 25. Movement of this platform 25 under the weight of the patron will be transmitted to the beam 75 and pivot this beam downwardly against the action of the spring 78. As the weighing pointer 26 is locked against rotation by the latch arm 155 (Fig. 6), the segmental gear 69 will be restrained from rotation by gravity in an anticlockwise direction, with the consequence that the weighing pointer 26 will remain in zero position until the patron deposits the required coin in the coin slot 29. Prior to the deposit of this coin and while standing on the platform 25, the patron will rotate the handle 136 (Fig. 13) to adjust the preselector pointer 27 to the indicia upon the scale 23 which he believes to be indicative of his weight.

Figure 2:
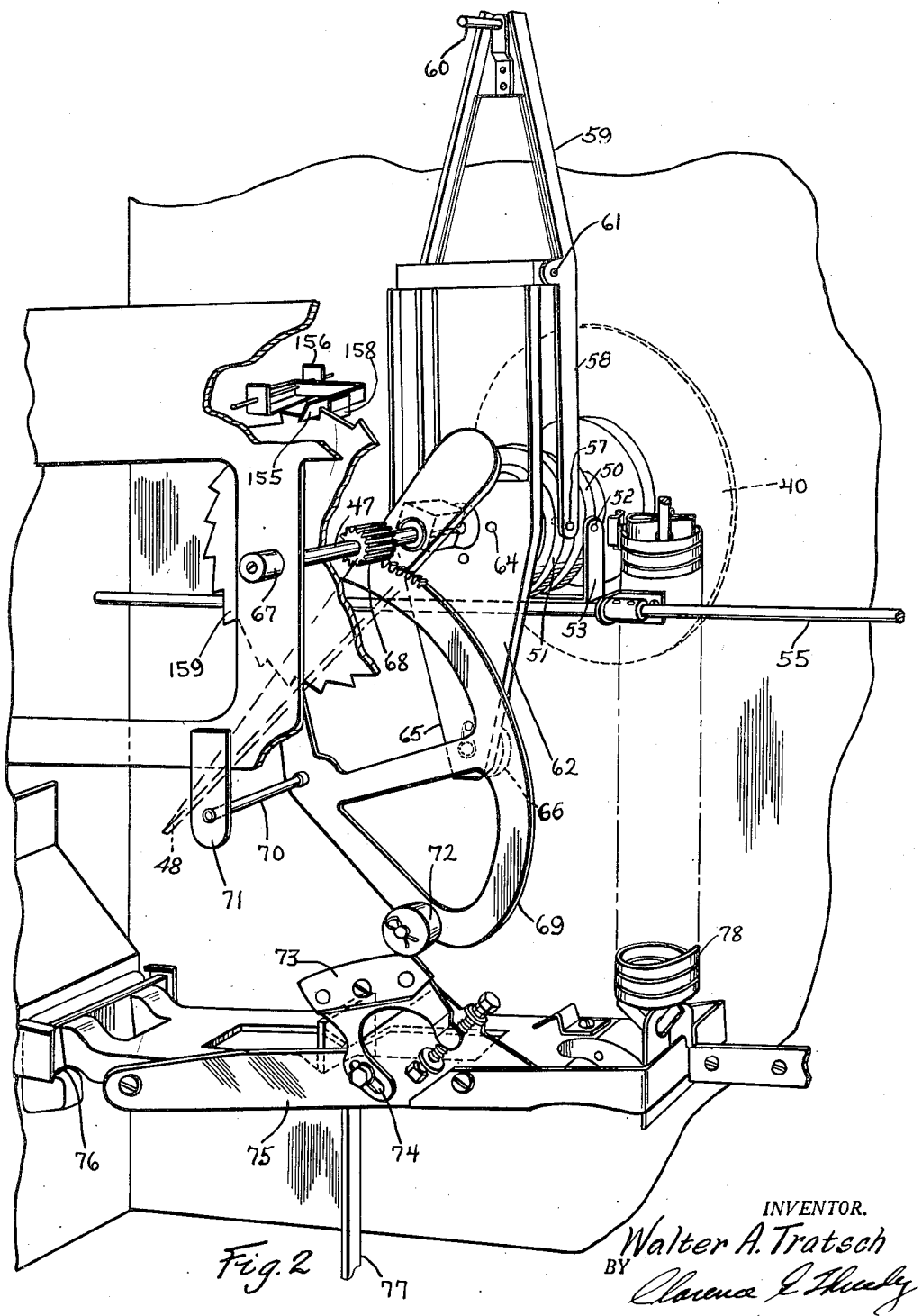
Fig. 2 is a fragmentary perspective view of the weighing mechanism embodied in the scale shown in Fig. 1.

As the latch finger 125 (Fig. 10) is disposed from latched engagement with the gear 127, rotation will be imparted to the pulley 40, and as the preselector pointer 27 rotates therewith, the preselector pointer 27 may be thus moved to the position indicative of the weight of the patron. When this is done and after a coin of proper denomination is inserted through the slot 29 of the escutcheon plate 28, by engagement of the coin with the end portion 81 of the rocker arm 82 as it passes through the chute 79, the rocker arm 82 will be rotated in an anticlockwise direction as viewed in Fig. 5. Upon movement of the rocker arm 82 in this anticlockwise direction, several things simultaneously take place. The weight indicating pointer is released for rotation; the preselecting pointer is latched against rotation; and the timing mechanism is released for operation. These operations take place as follows:

Movement of the rocker arm 82 in the aforesaid anticlockwise direction, will rock the shaft 84 (Fig. 3) in an anticlockwise direction as viewed in Fig. 5. The rocking of this shaft 84 in this anticlockwise direction will bear the finger 86 (Figs. 4 and 8) down against the trip lever 90, rocking the latter in an anticlockwise direction as viewed in Figs. 8 and 9. This pivotal movement of the trip lever 90 in this anticlockwise direction will rock the shaft 89 in the same direction. This rocking of the shaft 89 will pivot the latch finger 155 to release the wheel 159 (Fig. 6) for free rotation under the gravity acting rotation of the segmental gear 69 (Fig. 2). As the weight-indicating pointer 26 is fixed to the same shaft 47 as is the wheel 159, it likewise will be free to rotate to a position relative to the dial 23 to indicate the weight of the patron standing on the platform 25.

Rotation of this shaft 47 likewise rotates the blocking finger 48. If the patron has accurately guessed his weight, this blocking finger 48 will rotate to a position to the rear of the preselector pin 60 for reasons which will be hereinafter apparent.

This pivotal movement of the trip lever 90 by reason of its connection 120 with the lever 122, will pivot this lever 122 in a clockwise direction as viewed in Figs. 10 and 11, to permit the latch finger 126 to have latched engagement with the gear 127 and thereby latch this gear and the pulley 131 attached thereto against rotation by rotation of the hand wheel 136. This prevents the patron from readjusting the preselector finger 27 after having once deposited the coin through the coin slot 29. The pivotal movement of the trip lever 90 in the anticlockwise direction, as aforestated, releases the finger 93 to permit the arm 94 to be pivoted by action of the spring 103 in a clockwise direction. This pivotal movement of the arm 94 takes place upon release of the stop finger 98 from the stop wheel 102, whereupon upon this release of the stop finger 98 from the stop wheel 102, the power spring of the timing mechanism will effect rotation of this stop wheel 102, and as it moves in this direction, as viewed in Fig. 4, the trip finger 99 will drop into the space between the teeth 101 of the stop wheel 102. The movement of this finger 99 into that space effects rotation of the shaft 55 in a clockwise direction as viewed in Figs. 2 and 4, whereby to shift the grooved collar 49 relative to the hub 42, Fig. 13. If the blocking finger 62 and the preselector pin 60 do not coincide with respect to each other, this grooved collar 49 is pivoted from the position shown in full lines to the position shown in dotted lines, Fig. 13. This movement of the grooved collar 49 allows the shaft 55 to be rotated in the direction before stated so as to pivot the bell crank 149 in an anticlockwise direction as viewed in Fig. 5, thereby to pivot the valve plate 144 to the left as viewed in Fig. 5. This pivotal movement of the bell crank also moves the blocking finger 153 from the slot 154, permitting the coin to drop through the coin distributor 143 and thence out through the acceptance opening A into a suitable receptacle (not shown) for the collection of acceptable coins. If the blocking finger 62 coincides with the preselector pin 60, the shaft 55 will only be rotated a sufficient distance to move the blocking finger 153 from blocking position with respect to the passage of the coin through the coin distributor 143 and thence out through the reject opening and back to the patron as a reward for having accurately guessed his weight. The operation and movement of this blocking finger and the preselecting pin and the return of the coin, or the acceptance thereof, is substantially similar to that shown in the Simmons patent, No. 2,189,866, to which reference may be had for a more detailed description.

The shaft 55 is rotated in an opposite direction by engagement of the finger 99 with the teeth 101, which engagement between these two elements disposes the stop finger 98 into latched engagement with an adjacent cam lug 100. At the same time, the end portion 93 of the arm 94 is disposed in the notch 92 where it is held by the latch finger 90 until a coin is deposited and the weight of that coin effects rocking of the shaft 34 in the manner hereinbefore set forth.

The power spring 104 is substantially similar in construction to a clock, in which clock the spring is wound or placed under tension by a hand-operated key. In the construction shown in the drawings of this application, this power spring is wound to store power for the operation of the timing mechanism, each time the patron steps upon the platform, and this is accomplished through the medium of the pump 109 in the following manner.

When a patron steps upon the platform 25, his weight will cause pivotal movement of the beam 75. This pivotal movement of the beam 75 will be transmitted to the pump 109, which will move downwardly relative to the piston 100, the piston remaining stationary during this downward movement. As the beam, however, pivots upwardly or in an anticlockwise direction as viewed in Fig. 2, when the patron steps off the platform a certain degree of air pressure will be created in the pump, and this will act upon the piston and move the piston and pump upwardly simultaneously, thus moving upwardly the bar 111. As the pawl 112 carried by the bar 111 is in latched engagement with the rewind gear 113, this upward movement of the bar 111 will rotate the rewind gear 113 a predetermined distance, with the consequence that this rotation will effect winding of the power spring 104, the power spring 104 having one of its ends connected with the same shaft to which the rewind gear 113 is fixed. Should the power spring 104 be wound to its maximum, the tension of the spring will be sufficient to overcome the pneumatic action of the pump with the consequent result that the pump will not move the bar 111 upwardly for spring-winding action, but will remain stationary. In this way, over-winding the spring 104 is prevented.

By the foregoing arrangement, it is apparent that I have utilized the movement of the weighing beam 75 by the weight of the person on the platform 25 to maintain the spring 104 tensioned at all times to operate the mechanism for accepting or rejecting the coin. As the wheel 102 serves as a timing wheel, it is manifest that the acceptance or rejection of a coin must take place within the predetermined period of time allowed by the operation of this timing wheel 102.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a coin-controlled weight indicating scale, the combination with a weighing mechanism, a weight indicating finger operatively associated with said weighing mechanism, a preselecting weight indicating pointer, a blocking means operatively associated with said preselecting pointer, a coin guiding means operatively associated with said blocking means, and normally in a position to direct a coin through a return opening and movable when said blocking means is out of blocking relation with respect to said preselecting pointer to direct a coin into an acceptance opening, of means for moving said guiding means, means for actuating said moving means including a driving spring, an escapement means for the spring, a rebound gear for the spring, pawl means operatively associated with the weighing mechanism and the rebound gear for rotating the latter each time said weighing mechanism is operated, latch means controlling the operating of the actuating means, and means operable by a coin moving toward the guiding means for operating said latch means to release for operation said actuating means.

2. In a coin controlled weight indicating scale, the combination with a weighing mechanism and coin guiding means including a movable deflector plate movable to a position to direct a coin through an acceptance opening communicating with the guiding means from a position where the plate directs a coin through a return opening communicating with the guiding means, of means for moving said plate from said latter position, means for actuating said moving means including a power spring mechanism comprising a driving spring, a rewind gear for the spring mechanism, an escapement means for said mechanism and means operatively connecting the weighing mechanism and the rewind gear for rotating the latter each time the weighing mechanism is operated.

3. In a coin controlled weight indicating scale, the combination with a weighing mechanism and coin guiding means including a movable deflector movable to a position to direct a coin through an acceptance opening communicating with the guiding means from a position where it directs a coin through a return opening communicating with the guiding means, of means for moving said deflecting means out of said first position, means for actuating said moving means including a driving spring, an escapement means for the driving spring, a rewind gear for the spring, means operatively connecting the weighing mechanism and the rewind gear for rotating the latter each time said weighing means is operated, latch means controlling the operation of the actuating means, and means operable by a coin moving through the guiding means for actuating said latch means to release for operation said actuating means.

WALTER A. TRATSCH.

REFERENCES CITED

The following references are of record in the file of this patent:

UNITED STATES PATENTS

| Number | Name | Date |
|---|---|---|
| 783,993 | Caille | Feb. 28, 1905 |
| 1,206,958 | Watling | Dec. 5, 1916 |
| 2,189,866 | Simmons | Feb. 13, 1940 |